Jan. 23, 1968 J. D. ALLEN Re. 26,338

ADJUSTABLE, METERED, DIRECTIONAL FLOW CONTROL ARRANGEMENT

Original Filed April 22, 1963 3 Sheets-Sheet 1

INVENTOR.
JOHN D. ALLEN
BY
William J. Flynn
ATTORNEY

ADJUSTABLE, METERED, DIRECTIONAL FLOW CONTROL ARRANGEMENT

Original Filed April 22, 1963 3 Sheets-Sheet 2

INVENTOR.
JOHN D. ALLEN

BY

William J. Flynn
ATTORNEY

ADJUSTABLE, METERED, DIRECTIONAL FLOW CONTROL ARRANGEMENT

Original Filed April 22, 1963 3 Sheets-Sheet 3

INVENTOR.
JOHN D. ALLEN
BY
William J. Flynn
ATTORNEYS

United States Patent Office

Re. 26,338
Reissued Jan. 23, 1968

26,338
ADJUSTABLE, METERED, DIRECTIONAL FLOW CONTROL ARRANGEMENT

John D. Allen, South Euclid, Ohio, assignor to Fawick Corporation, a corporation of Michigan Original No. 3,234,957, dated Feb. 15, 1966, Ser. No. 274,462, Apr. 22, 1963. Application for reissue Jan. 16, 1967, Ser. No. 615,876
11 Claims. (Cl. 137—117)

Matter enclosed in heavy brackets [ ] appears in the original patent but forms no part of this reissue specification; matter printed in italics indicates the additions made by reissue.

*ABSTRACT OF THE DISCLOSURE*

*A flow control arrangement for selectively controlling the direction and speed of a hydraulic motor includes a reversible, adjustable metering orifice, and a pressure-compensating arrangement for regulating the flow through the orifice by bypassing excess flow around it and variably restricting the flow through it.*

This invention relates to an arrangement for adjustably establishing a reduced flow of pressure fluid in a selected direction to and from a fluid-operated device.

Various directional flow control arrangements, such as spool valves, have been provided heretofore for controlling the flow of hydraulic fluid to and from a fluid-operated actuator, such as a piston and cylinder. Such prior arrangements have been satisfactory where the valve was fully actuated to each of its operating positions to open fully its passages, so as to provide full speed operation of the fluid-operated actuator. However, such arrangements have not been entirely satisfactory where it was desired to provide a reduced, or metered, flow of fluid to and from the fluid-operated actuator to operate the actuator at reduced speed. For example, with conventional spool valves, if the valve spool is positioned to provide partial flow conditions a very slight movement of the valve spool will produce a comparatively large change in the flow rate. To overcome this difficulty, it has been proposed to provide metering grooves or notches in the valve spool to enable more effective control over the flow rate for a given amount of movement of the valve spool. However, such expedients have not been entirely satisfactory because the flow rate through such grooves or notches varies with the pressure of the fluid, so that a given setting of the valve spool does not necessarily produce a given flow rate.

The present invention relates to a novel flow control arrangement which completely overcomes these difficulties [and enables the selective metered control simultaneously of the flows of fluid both to and from a fluid-operated actuator].

*It is an object of this invention to provide a novel and improved flow control arrangement for a reversible hydraulic motor or the like which includes a reversible, variable metering orifice device which is adjustable to determine both the direction and the speed of the motor, and pressure-compensating means connected to be responsive to the fluid pressure drop across the orifice device so as to regulate the flow through it by bypassing excess flow around the orifice device and also restricting the flow through it, so as to maintain a substantially constant flow rate through the orifice device despite changes in the supply pressure or the load on the motor.*

*Another* [Accordingly, it is an] object of this invention [,] *is* to provide a novel and improved unitary fluid control arrangement which enables the user to selectively establish reduced fluid flows simultaneously both to and from a fluid-operated actuator which are not dependent upon the pressure of the fluid supply or the load on the actuator.

It is also an object of this invention to provide such an arrangement which enables the user to have a unified and accurate control over the flow rates both to and from the actuator, so as to provide the desired reduced speed of operation of the fluid-operated actuator.

Another object of this invention is to provide such an arrangement which enables the user to have complete control at all times over the movement of the load on the fluid-operated actuator, there being no danger that the load may "run away" from the actuator or move in the opposite direction from what is intended.

Another object of this invention is to provide such an arrangement which is relatively inexpensive and simple and foolproof in operation.

Further objects and advantages of this invention will be apparent from the following detailed description of certain presently-preferred embodiments thereof, which are illustrated schematically in the accompanying drawings.

FIGURE 1

Figure 1:
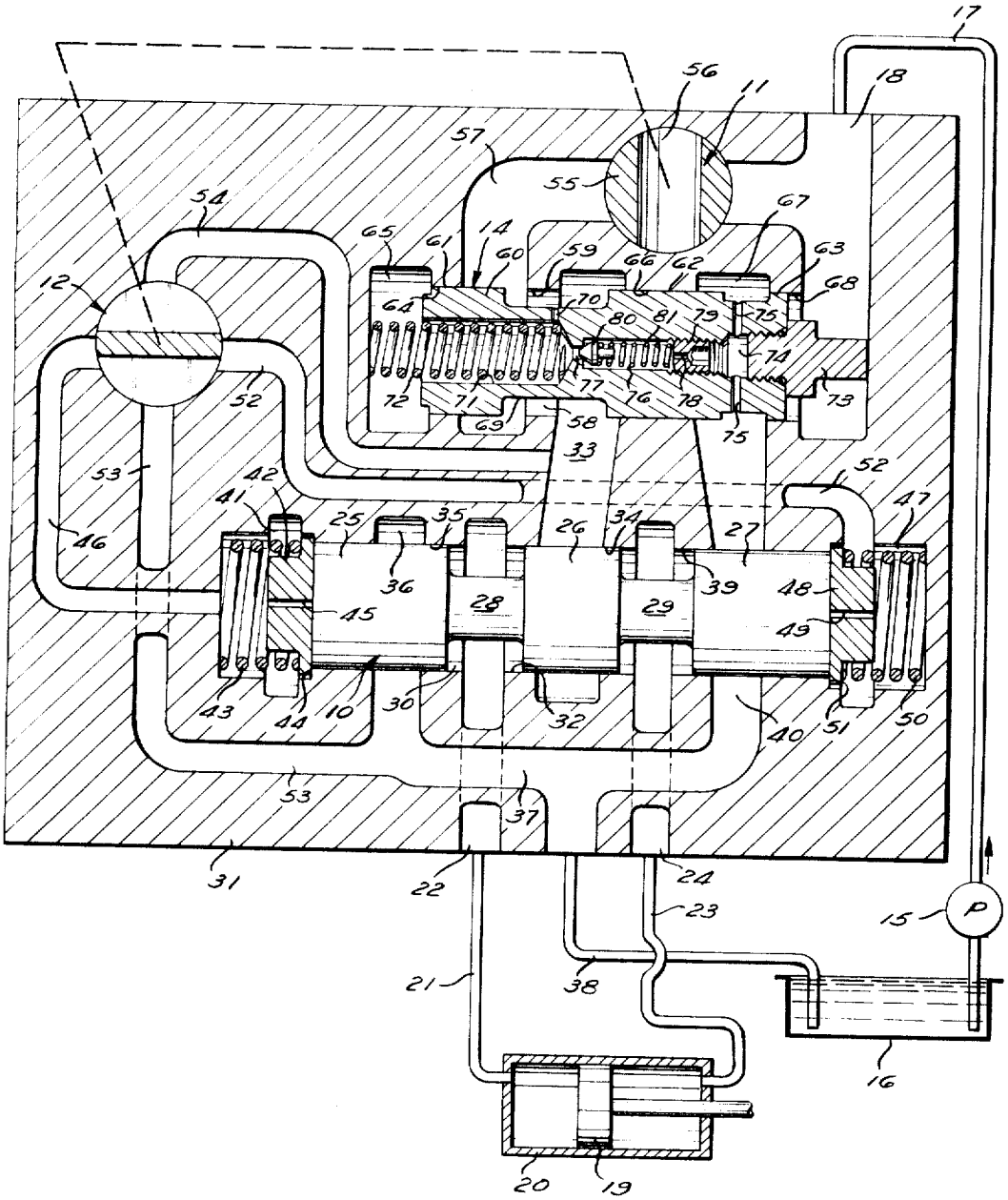
FIGURE 1 is a schematic view, partly in section, showing one embodiment of the present fluid control arrangement.

Referring first to FIGURE 1, the particular embodiment of the present flow control arrangement which is shown therein comprises, in broad outline, the following components:

(1) a directional spool valve 10 of conventional design;
(2) a metering orifice 11 and a pilot valve 12, operated manually (or otherwise) by the user of the system to selectively set the metered flow of pressure fluid to the spool valve and also to supply the pilot pressure for operating the spool valve in one direction or the other; and
(3) a pressure-compensating device 14 which maintains the flow rate of fluid through the metering orifice 11 independent of the supply fluid pressure or the load on the fluid pressure-operated actuator which this flow control arrangement operates.

The remainder of the system is shown schematically. It includes a pump 15 for pumping suitable hydraulic fluid, such as oil or water, from a sump 16 through an inlet line 17 to an inlet opening 18 just ahead of the metering orifice 11. The fluid-operated actuator in the system is shown as a piston 19 operating in a cylinder 20. One end of the cylinder is connected through a line 21 to an outlet passage 22 of the spool valve 10. The opposite end of the cylinder is similarly connected through another line 23 to a second outlet passage 24 of the spool valve 10. The load (not shown) on the actuator is coupled to the shaft of piston 19 to be operated thereby.

The spool valve 10 comprises a valve spool having three axially spaced, cylindrical lands 25, 26 and 27 integrally interconnected by rigid stem portions 28 and 29, respectively. The lands on the valve spool are slidably, but sealingly, received in a cylindrical bore 30 formed in the housing 31. This bore presents a cylindrical land surface 32 disposed between an inlet passage 33 and the outlet passage 22, which leads to the left end of cylinder 20. Similarly, the bore 30 presents a cylindrical land surface 34 disposed between the inlet passage 33 and the other outlet passage 24, which leads to the right end of cylinder 20. The bore 30 also presents a cylindrical land surface 35 which is disposed between passage 22 and an annular recess 36 connected to a return passage 37 which leads through a return line 38 back to the sump 16. Also the bore 30 presents a cylindrical land surface 39 which is disposed between passage 24 and a passage 40 connected to the same return passage 37.

In the neutral position of the valve spool, as shown in FIGURE 1, its central land 26 sealingly engages both land surfaces 32 and 34, its left land 25 sealingly engages the land surface 35, and its right land 27 sealingly engages the land surface 39. Accordingly, in this position of the valve spool there is no flow of fluid from the inlet passage 33 to either outlet passage 22 or 24, no flow of fluid from passage 22 to the return passage 37, and no flow of fluid from passage 24 to the return passage 37.

When the valve spool is shifted to the left in FIG. 1, its central land 26 disengages from the land surface 34 and its left land 25 disengages from the land surface 35, while its central land 26 continues to sealingly engage the land surface 32 and its right land 27 continues to sealingly engage the land surface 39. Accordingly, fluid can flow from the inlet passage 33 past the land surface 34 to the outlet passage 24, and return flow of fluid takes place from the other outlet passage 22 past land surface 35 to the return passage 37.

When the valve spool is shifted to the right in FIG. 1, its central land 26 disengages from the land surface 32 and its right land 27 disengages from the land surface 39, while its central land 26 sealingly engages the land surface 34 and its left land 25 sealingly engages the land surface 35. Therefore, fluid from the inlet passage 33 flows past the land surface 32 to the outlet passage 22, and return flow of fluid takes place via the other outlet passage 24 past land surface 39 to the return passage 37.

At its left end, the bore 30 which receives the valve spool communicates with a chamber or recess 41. An apertured plate 42 in this chamber is biased by a compression spring 43 against an annular shoulder 44 located at the juncture between the bore 30 and this chamber 41. This plate has a central axial passage 45. A first pilot passage 46 extends from the pilot valve 12 to this chamber 41.

Similarly, a chamber 47 at the opposite end of the bore 30 receives a plate 48 having a central passage 49. A spring 50 biases this plate against an annular shoulder 51 located at the juncture between bore 30 and chamber 47. A second pilot passage 52 extends from the pilot valve 12 to this chamber 47.

In the neutral position of the valve spool, as shown in FIG. 1, its opposite ends abut against the oppositely spring-biased plates 42 and 48.

The valve spool may be shifted to the left by operating the pilot valve 12 to supply pilot pressure fluid via passage 52 to chamber 47 and from there through the passage 49 in plate 48 against the right end of the valve spool. At this time, the pilot valve 12 also connects the other pilot passage 46 to a passage 53 connected to the return passage 37. The bias spring 43 yields to permit the valve spool to move to the left.

The valve spool may be shifted to the right by operating the pilot valve 12 to supply pressure fluid via passage 46 to chamber 41 and from there through the passage 45 in plate 42 against the left end of the valve spool. At this time, the pilot valve 12 also connects the other pilot passage 52 to the return passages 53, 37. Bias spring 50 yields to permit movement of the valve spool to the right.

The pilot valve 12 may be a conventional plug valve. In its closed position, as shown in FIGURE 1, it blocks the flow of fluid from its inlet passage 54 to either pilot passage 46 or 52 or to the return passage 53. When turned clockwise in FIGURE 1 from its closed position, it connects its inlet passage 54 to the pilot passage 52 and it connect pilot passage 46 to the return passage 53. When turned counter-clockwise in FIGURE 1 from its closed position, it connects its inlet passage 54 to the pilot passage 46 and it connects pilot passage 52 to the return passage 53.

Preferably, the pilot valve 12 is connected integrally to the rotatable metering orifice 11, so that they turn together in unison. Desirably, both the pilot valve 12 and the metering orifice 11 may be incorporated in a single plug valve which may be operated manually by a suitable handle or the like.

The metering orifice 11 is constituted by a rotatable plug 55 having a metering passage 56. This plug may be turned either clockwise or counter-clockwise from its closed position (FIG. 1) to connect the inlet passage 18 to a passage 57. The extent to which the plug 55 is turned determines the size of the flow restriction which its presents to the inlet passage 18.

The outlet passage 57 from the metering orifice 11 leads to a passage 58 inside a cylindrical land surface 59. Passage 58 leads to the inlet passage 33 to the spool valve 10. The inlet passage 54 to the pilot valve 12 is connected to passage 33.

In accordance with the present invention, the rate of fluid flow to the fluid-operated actuator is maintained at a value determined by the setting of the metering orifice and independent of the load on the actuator or the pressure of the pump fluid.

Referring to FIGURE 1, the pressure-compensating device 14 for this purpose comprises a slidable piston 60 having three axially spaced, cylindrical lands 61, 62 and 63. The piston land 61 sealingly engages a cylindrical internal land surface 64 in the housing 31 disposed between the passage 57 and a chamber or recess 65. The middle piston land 62 sealingly engages a cylindrical internal land surface 66 on the housing 31 which is disposed between the inlet passage 33 to the spool valve and a chamber 67 connected to the return passages 40, 37. The piston land 63 sealingly engages a cylindrical internal land surface 68 in the housing 31 disposed between the inlet passage 18 and chamber 67 leading to the return line.

Between its lands 61 and 62 the piston 60 is formed with a circumferential groove 69 of appreciable axial extent. A restricted passage or orifice 70 extends radially from this groove 69 to an axial recess 71 formed in the left end of the piston and communicating with chamber 65. A compression spring 72 in this chamber and the piston recess biases the piston 60 to the right. At its opposite end, the piston carries a stop 73 which is positioned to abut against the opposite wall of inlet passage 18 to limit the extent to which the piston is biased to the right by spring 72.

Immediately to the left of this stop 73, the piston is formed with an internal chamber 74. Radial openings 75 connect this chamber 74 to the return chamber 67 in housing 31. The piston has an axial passageway extending between the recess 71 at its left end and its internal chamber 74. This passageway is constituted by an axial chamber 76, a port 77 at the left end of this chamber connecting it to recess 71, and a passage 78 formed in a plug 79 screw-threadedly mounted in the piston 60 between the right end of passage 76 and chamber 74. A poppet 80, which operates as a relief pilot valve normally closes the port 77 leading into chamber 76. The poppet is biased to its closed position by a coil spring 81, which is engaged under compression between the poppet and the inner end of plug 79. The adjustment of plug 79, which determines the compression of spring 81, controls the fluid pressure at which the poppet 80 will unseat. Normally, this will be a relatively high pressure.

In the operation of this pressure-compensating device, the right end of the piston 60 is exposed to the pump pressure at inlet passage 18. With the metering orifice 11 partially open, there will be a fluid pressure drop across this orifice. The fluid pressure at the discharge side of the metering orifice is applied, through passages 57 and 58, piston orifice 70 and piston recess 71, against the left end of the piston.

Piston 60 functions as in a flow divider to maintain constant the fluid pressure drop across the metering orifice 11, for whatever setting the metering orifice has been adjusted. By holding the fluid pressure drop constant, the piston will thereby hold constant the flow rate through the metering orifice.

This regulating function of piston 60 takes place as follows:

With the piston's opposite ends exposed to the respective fluid pressures on opposite sides of the metering orifice 11, the difference between these fluid pressures determines the axial position of the piston. This pressure differential acts against the biasing force exerted by spring 72.

For a given setting of the orifice size, an increase in fluid flow through the orifice causes a greater fluid pressure differential acting on piston 60. The greater this pressure differential, the greater will be the displacement of piston 60 to the left in FIG. 1. The piston land 63 will disengage from the land surface 68, permitting some of the incoming fluid at inlet passage 18 to flow into chamber 67 and thence through passages 40 and 37 to the return line 38, bypassing the metering orifice 11. At the same time, the displacement of piston 60 to the left will move its land 62 toward passage 58 to partially restrict the outlet flow from the metering orifice 11 to the spool valve 10. The net effect is that the flow rate through the metering orifice 11 will be maintained substantially constant at a value determined by the position to which the metering orifice has been set, and any changes in the fluid pressure at either side of the metering orifice will not substantially change this flow rate. Such pressure changes might be caused by changes in the pump fluid pressure at inlet side of the metering orifice 11 or by changes in the load on the fluid-operated actuator which would change the fluid pressure at the outlet side of the metering orifice 11.

Under normal operating conditions, the spring-pressed poppet 80 in piston 60 will remain closed. However, in the event of excessive fluid pressure at the port of the actuator cylinder 20 to which passage 33 is connected through the spool valve, the fluid pressure at passage 33 will unseat the poppet 80. A very small flow past the poppet valve 80 will produce a pressure drop across the piston orifice 70, so that the fluid pressure acting against the left end of piston 60 will be substantially less than the pump fluid pressure acting against the right end of this piston. This pressure unbalance on piston 60 causes it to move to the left, connecting the inlet passage 18 directly to the return passages to thereby relieve the pressure.

The piston orifice 70 also acts as a damper to prevent rapid fluctuations of piston 60.

Operation

To summarize the overall operation of the FIGURE 1 arrangement, the operator will manually (or otherwise) turn the metering orifice 11 and the pilot valve 12 in unison to establish the desired reduced flow rate and the desired direction of flow. The flow rate through the metering orifice 11 is automatically regulated by the pressure compensating device 14, so that it will not change substantially even if pressure changes occur. Depending upon which direction the pilot valve 12 is turned, it will supply pilot fluid pressure against one end or the other of the valve spool to establish the corresponding flow direction through the spool valve 10.

FIGURE 2

Figure 2:
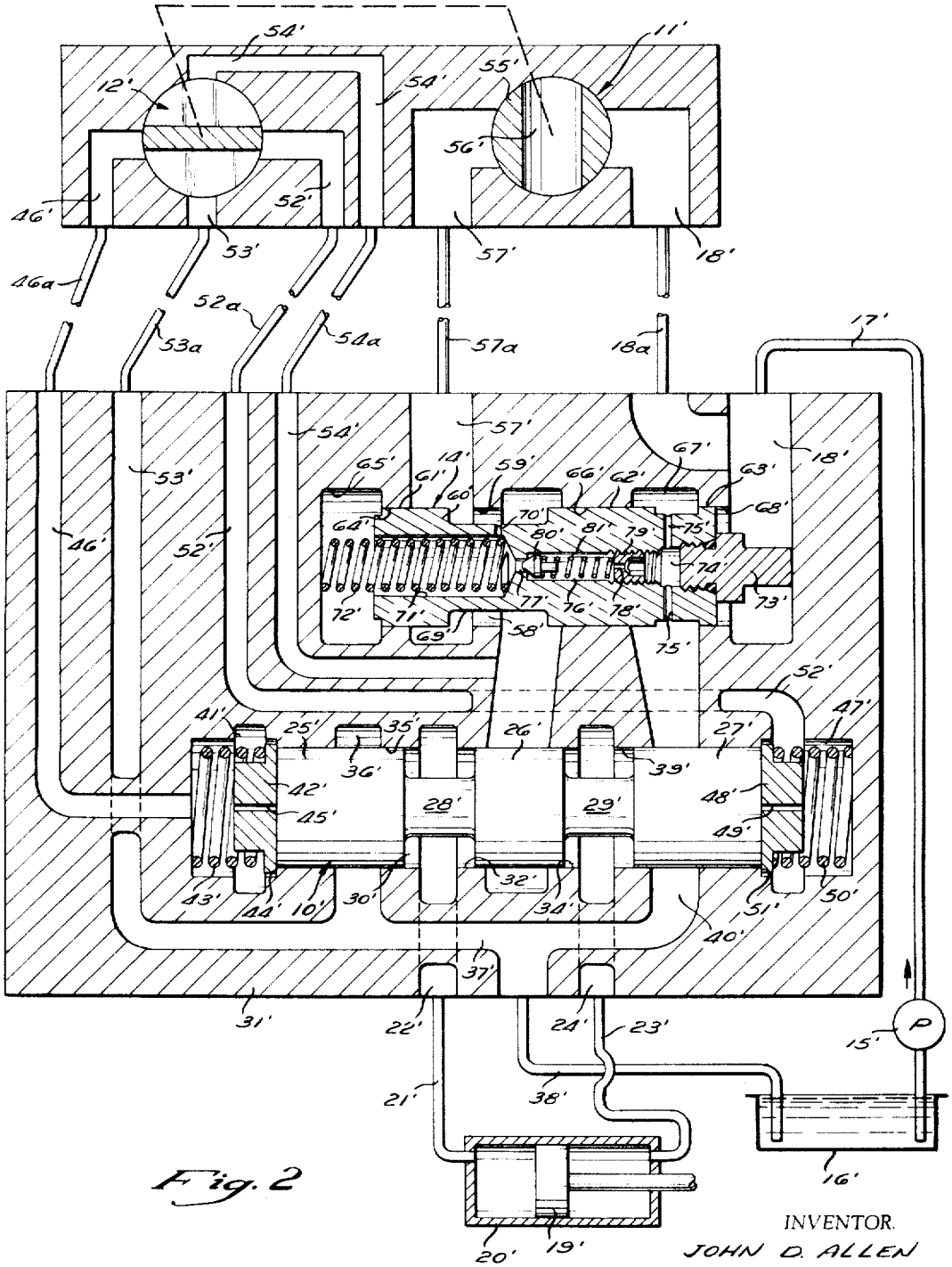
FIGURE 2 is a similar view of an alternative embodiment in which the portion of the control which the user may adjust manually is physically remote from the other components of the fluid system.

The embodiment of FIGURE 2 is essentially the same as the embodiment of FIGURE 1, except that the operator-controlled components (namely, the metering orifice and the pilot valve) are physically distant from the pressure compensating device and the spool valve. Corresponding elements are given the same reference numerals as in FIGURE 1, with a "prime" subscript added.

The embodiment of FIGURE 2 enables the control components (metering orifice 11' and pilot valve 12') to be located close to the operator and the spool valve 10' close to the actuator 19', 20' which it operates. The relatively large lines 17', 21', 23' and 38', which are required for main system flow, need not be run to the operator's control position. Relatively small lines 18a, 57a, 54a, 52a, 53a and 46a may be provided connecting the control unit to the main system unit. This reduces the power losses and heating and generally simplifies the construction of the system.

The operation of the FIGURE 2 arrangement is essentially the same as already described in detail for FIGURE 1.

FIGURE 3

Figure 3:
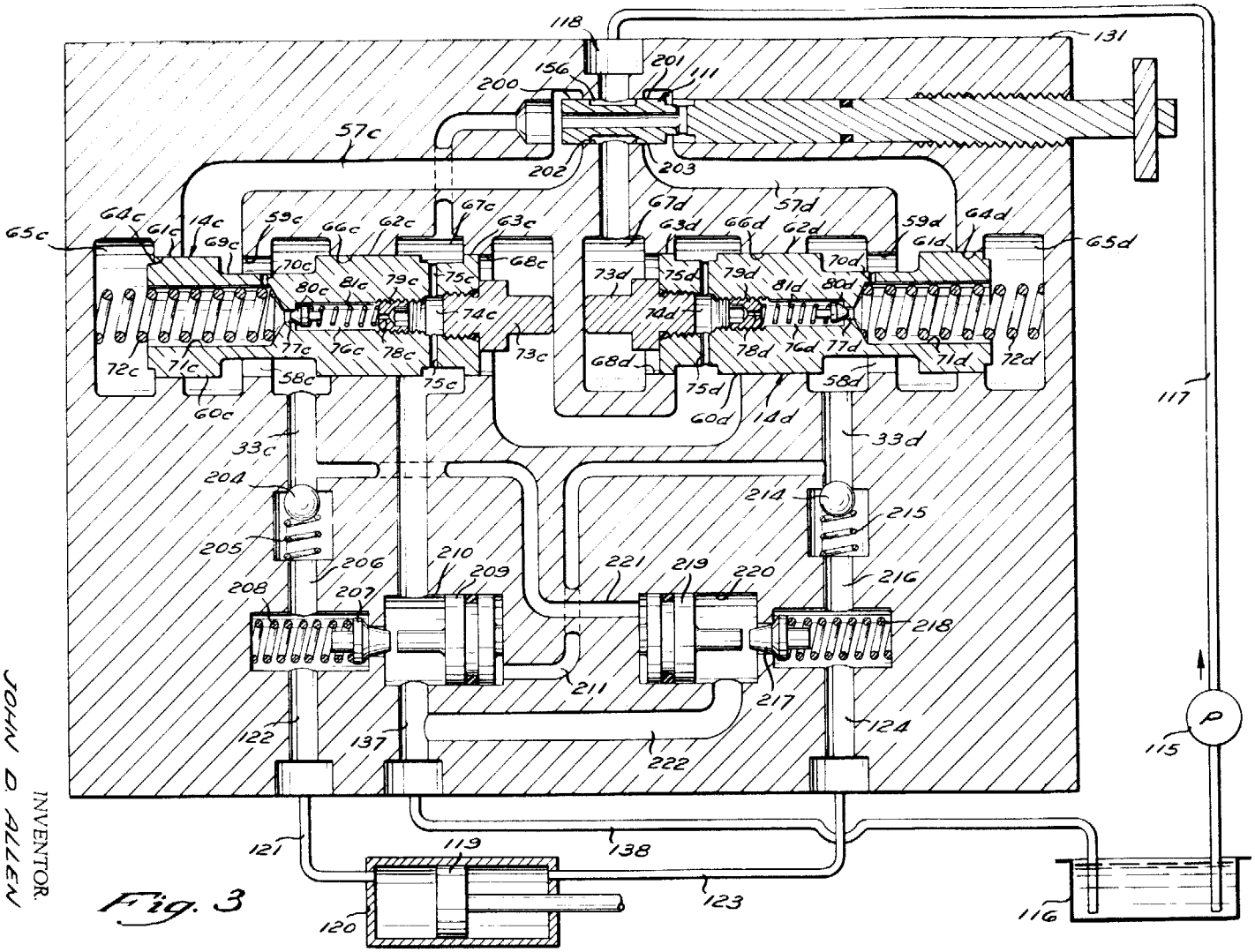
FIGURE 3 is a similar view of a third embodiment of the present fluid control arrangement.

In the embodiment of FIGURE 3, the functions of the metering orifice and the pilot valve are combined in a single plug valve 111 which is threadedly mounted in the housing 131. This plug valve has a circumferential groove 156 in its periphery between cylindrical lands 200 and 201. In the closed position of this valve, these lands sealingly engage complementary housing land surfaces 202, 203 which are located respectively between the inlet passage 118 and left-hand and right-hand outlet passages 57c and 57d. When the plug valve 111 is advanced to the left, its peripheral groove 156 provides restricted fluid communication between passages 118 and 57c, while the other outlet passage 57d remains blocked from fluid communication with the inlet passage 118. Conversely, when the plug valve is moved to the right, its peripheral groove 156 provides restricted fluid communication between passages 118 and 57d, while the other outlet passage 57c is blocked from fluid communication with the inlet passage 118. The peripheral groove 156 constitutes the variable restriction orifice for providing metered flow in one direction or the other.

Associated with the directional metering orifice 111 are a left-hand pressure compensating device 14c and a right-hand pressure compensating device 14d. Each of these pressure compensating devices is constructed and arranged substantially identical to the pressure compensating device 14 in FIG. 1, and hence a detailed description of them is unnecessary. Corresponding elements of these devices are given the same reference numerals as in FIG. 1, with a subscript "c" or "d" added.

The chamber 67d at the left end of the right-hand pressure compensating piston 60d is connected directly to the inlet passage 118, so that when fluid flow through the metering orifice 111 is to the right this piston will regulate such metered flow.

When fluid flow through the metering orifice 111 is to the left, piston 60d will move to the right, connecting chamber 67d to the corresponding chamber 67c at the right end of piston 60c. Accordingly, piston 60c will respond to the pressure drop across the metering orifice to maintain substantially constant the rate at which fluid flows through the metering orifice.

The outlet passage 33c from the left-hand pressure compensating device 14c leads to a check valve 204, which is spring-biased to its closed position by a compression spring 205. An outlet passage 206 from this check valve leads to the passage 122 which is connected through line 121 to the left end of the fluid-operated actuator 119, 120.

A normally closed poppet valve 207 is disposed between passage 122 and the return passage 137. This poppet valve is biased closed by a compression spring 208.

For unseating this poppet valve there is provided a piston 209 slidable in a chamber 210. The return passage 137 communicates with this chamber at one side of piston 209. A passage 211, which is connected to the outlet passage 33d from the right-hand pressure compensating device 14d, communicates with chamber 210 at the opposite side of piston 209.

A check valve 214, which is biased closed by a compression spring 215, is connected between the outlet passage 33d from the right-hand pressure compensating device 14d and a passage 216 leading, via passage 124, to the right end of the actuator 119, 120.

A normally closed popper valve 217 is disposed between passage 124 and a passage 222 connected to the return passage 137. A compression spring 218 biases this poppet valve closed.

For unseating the poppet valve 217 there is provided a piston 219 slidable in a chamber 220. The return passage 222 communicates with this chamber at one side of piston 219. A passage 221, which is connected to the outlet passage 33c from the left-hand pressure compensating device 14c ahead of check valve 204, communicates with chamber 220 at the opposite side of piston 219.

The check valves 204, 214, poppet valves 207, 217, pistons 209, 219, and associated passages together constitute a directional valve means for controlling the fluid flow to and from the actuator 119, 120. This directional valve means is under the control of the combined metering orifice and the pilot valve 111 in essentially the same manner as the directional spool valve in the preceding embodiments.

Operation

In the operation of this arrangement, when the metering orifice 111 is shifted to the left, fluid flows from the inlet passage 118 to passage 33c and thence past the check valve 204 to the line 121 leading to the left end of the actuator 119, 120.

The actuator piston 119 in the actuator cannot move until a return path is provided for fluid from the right end of cylinder 120. The back pressure at passage 33c is applied, via passage 221, against the left end of piston 219 which moves to the right and unseats the poppet valve 217 to provide this return path. This return path is through line 123, passage 124, past the now-open poppet valve 217, return passages 222 and 137, and return line 138 to the sump 116.

The reverse action takes place when the metering orifice is adjusted to establish metered fluid flow to the right.

In each of the foregoing embodiments of the present invention the user of the present flow control arrangement is able, by adjusting a single control handle, to accurately set the flow rates both to and from the fluid-operated actuator as well as the flow direction.

Since the metering orifice is pressure compensated, as described, the rate of input fluid flow to the fluid-operated actuator does not change with changes in the input pressure or changes in the pressure required to operate the actuator. Therefore, changes in the pump fluid pressure or in the load on the actuator will not change this input flow rate to the actuator which the user established by a given setting of the metering orifice. Accordingly, the speed of operation of the actuator will always be the same for a given setting of the metering orifice. Also, very smooth modulation of the fluid flow, proportional to the adjustment of the metering orifice, is obtained.

The return flow from the fluid-operated actuator also is controlled by the setting of the metering orifice in the present invention. Normally, this return flow will be the same as the regulated input flow to the actuator. In the present invention the return flow rate is positively controlled by restricting the return flow path at any time when at least some positive pressure does not exist at the inlet to the actuator. That is to say, the load on the actuator cannot run away from the operator's control. In certain equipment, such as boom type cranes, when the load is being lowered it may develop a substantial pressure which tends to cause return flow out of the actuator cylinder much faster than fluid is supplied by the pump, producing a partial vacuum in the actuator cylinder and causing the load to fall freely. With the present control arrangement, this is prevented. In the embodiments of FIGS. 1 and 2, if the fluid pressure at the inlet port of the actuator cylinder drops, the pilot fluid pressure which is holding the spool valve open will also drop, permitting the valve spool to move back toward its closed position, thereby restricting or completely stopping the return flow from the actuator cylinder and preventing the load from running away. In the embodiment of FIG. 3, if there is a pressure drop at the inlet port of the actuator cylinder there is also a reduction in the fluid pressure on the piston which is holding open the poppet valve in the return line from the actuator cylinder, so that this poppet valve tends to close and thereby prevents the load from running away. Thus, in each embodiment, the directional valve means regulates the return flow from the fluid-operated actuator in accordance with the input flow to the actuator, which is determined by the setting of the metering orifice.

The present control arrangement is particularly advantageous where the directional valve means is a conventional open-center spool valve. With such valves it is very difficult to insure that the open-center passage is restricted to build up pump pressure just as the cylinder port is opened to the pump. If the valve spool is partially moved to lift the load slowly and the cylinder "up" port opens to the pump port before the open-center passage restricts the pump flow to the return line, the load may actually drop, even though the valve is being moved to the "lift" position. This condition is completely avoided in the present invention without the need for load check valves to prevent it.

While certain presently-preferred embodiments of this invention have been described in detail and illustrated schematically in the accompanying drawing, it is to be understood that various modifications, omissions and refinements which depart from the disclosed embodiments may be adopted without departing from the spirit and scope of this invention. For example, the closed-center spool valve of FIGS. 1 and 2, which blocks the pump from the fluid-operated actuator when the valve spool is in its neutral position, may be replaced by an open-center spool valve, in which the pump fluid is bypassed when the valve spool is in its neutral position, or by a float-type spool valve, in which the cylinder ports, the pump port and the return port are interconnected when the valve spool is in its neutral position. Also, the unitary control element, which provides the metering orifice and the pilot valve in each embodiment, may be an axially shiftable spool valve instead of a rotatable plug valve, as described.

I claim:

[1. A directional flow conrol arrangement for selectively operating a fluid-operated actuator means at a controlled speed comprising:

directional valve means having passages for connection to said actuator means to selectively pass fluid to and from said actuator means;

adjustable means having connections to said directional valve means for selectively establishing a reduced flow of input fluid to said directional valve means and for selectively operating said directional valve means to establish the direction of fluid flows therethrough;

and means operatively associated with said adjustable means to regulate the flow of input fluid to said directional valve means.]

[2. A directional flow control arrangement for adjustably operating a fluid-operated actuator means at a controlled speed comprising:

fluid pressure-operated directional valve means having passages for connection to said actuator means and operable to selectively pass input pressure fluid to said actuator means and to pass return fluid from said actuator means;

adjustable means in fluid communication with said directional valve means at the latter's inlet side and operative to selectively meter the flow of input fluid to said directional valve means and to apply fluid pressure against said directional valve means to operate the latter to establish the direction of input and return fluid flows therethrough;

and pressure compensating means operatively associated with said adjustable means to regulate the metered flow of input fluid therethrough to said directional valve means.]

[3. The arrangement of claim 2 wherein said adjustable means includes a metering orifice, and wherein there are provided means defining an inlet passage leading to said metering orifice and means defining an outlet passage leading from said metering orifice to said directional valve means, and wherein said pressure compensating means comprises a reciprocable piston in said outlet passage, said piston being exposed to the fluid pressure at said inlet passage to be urged thereby in one direction to restrict the fluid flow through said outlet passage, said piston having a restricted passage therein which is open at one end to said outlet passage, means defining a fluid pressure chamber at the opposite end of said restricted passage for applying fluid pressure against the piston which urges the piston in the opposite direction against the force exerted by the fluid pressure at said inlet passage, and a normally closed relief valve in said piston exposed to the fluid pressure in said chamber and operable to open when the fluid pressure thereat exceeds a predetermined value to thereby establish a pressure drop across said restricted passage which pressure unbalances the piston for movement in said one direction by the fluid pressure at said inlet passage.]

[4. A directional flow control arrangement for selectively operating a fluid-operated actuator means at a controlled speed comprising:

directional valve means having passages for connection to said actuator means to pass pressure fluid to and from said actuator means, said directional valve means being operable by fluid pressure in one direction to pass input fluid to said actuator means and to pass return fluid from said actuator means, said directional valve means being operable by fluid pressure in another direction to reverse the directions of fluid flow therethrough to and from said actuator means;

operator-controlled adjustable means in fluid communication with said directional valve means ahead of the latter for selectively establishing a reduced flow of input fluid to said directional valve means and for selectively operating said directional valve means to establish the direction of fluid flows therethrough to and from said actuator means;

and pressure compensating means for regulating said reduced flow of input fluid independent of the pressure of the input fluid.]

[5. In combination with directional valve means having a first position for establishing input and return flows of fluid therethrough and a second position for reversing the input and return flows of fluid therethrough, operator-controlled adjustable means in fluid communication with said directional valve means for selectively establishing a reduced flow of input fluid to said directional valve means and selectively operating said directional valve means to establish the direction of input and return flows therethrough;

and pressure compensating means operatively associated with said adjustable means to regulate the flow of input fluid therethrough independent of the pressure of the input fluid thereto.]

[6. The combination of claim 5, wherein said pressure compensating means includes means operable in response to excessive pressure of the input fluid to said directional valve means to reduce said pressure.]

[7. The combination of claim 5, wherein said pressure compensating means includes means operable to maintain a substantially fixed pressure differential across said operator-controlled means.]

[8. In combination, a directional valve operable by pilot fluid pressure in one direction to a first position establishing a predetermined fluid flow therethrough and operable by pilot fluid pressure in the opposite direction to a second position establishing a different fluid flow therethrough, an operator controlled adjustable pilot valve for selectively controlling the application of fluid pressure against said directional valve to selectively determine the latter's position, an operator-controlled metering orifice connected ahead of said directional valve in fluid communication therewith for selectively supplying a reduced flow of input fluid thereto, and pressure compensating means connected across said metering orifice and responsive to the pressure drop across said metering orifice to regulate the flow rate of input fluid therethrough to said directional valve.]

[9. The combination of claim 8 wherein said pilot valve and said metering orifice are coupled to each other for adjustment in unison.]

10. A directional flow control arrangement for selectively operating a fluid-operated actuator means at a controlled speed comprising:

directional valve means having provision for establishing a flow of input fluid to said actuator means and for simultaneously establishing a return flow from said actuator means, said directional valve means being selectively operable by fluid pressure to control the direction of input and return flows to and from said actuator means, said directional valve means being operable to restrict the return flow from said actuator means so as to maintain a positive pressure of the input flow to said actuator means;

means defining a metering orifice in fluid communication with said directional valve means ahead of the latter and a pilot valve for selectively establishing a controlled flow of input fluid to said directional valve means and for selectively operating said directional valve means to establish the direction of input and return fluid flows therethrough to and from said actuator means;

and pressure compensating means connected across said metering orifice for regulating said controlled flow of input fluid therethrough to said directional valve means.

11. A directional flow control arrangement for selectively operating a fluid-operated actuator means at reduced speed comprising:

directional valve means having provision for establishing a flow of input fluid to said actuator means and for simultaneously establishing a return flow from said actuator means, said directional valve means being selectively operable by fluid pressure to control the direction of input and return flows to and from said actuator means, said directional valve means being operable to restrict the return flow from said actuator means, the amount of restriction of the return flow being a direct function of the fluid pressure operating said directional valve means;

a unitarily controlled metering orifice and pilot valve in fluid communication with said directional valve means for selectively establishing a controlled flow of input fluid to said directional valve means and for selectively operating said directional valve means to establish the direction of input and return fluid flows therethrough to and from said actuator means;

and pressure compensating means connected across said metering orifice and operable to maintain a substantially fixed pressure differential across said metering orifice.

12. A directional flow control arrangement for selectively operating a fluid-operated actuator means at reduced speed comprising:

directional valve means having provision for establishing a flow of input fluid to said actuator means and for simultaneously establishing a return flow from said actuator means, said directional valve means being selectively operable by fluid pressure to control the direction of input and return flows to and from said actuator means, said directional valve means being operable to restrict the return flow from said actuator means in response to abnormally low pressure of the input flow to said actuator means;

a unitarily controlled metering orifice and pilot valve in fluid communication with said directional valve means ahead of the latter and operative to selectively establish a reduced flow of input fluid to said directional valve means and to selectively apply fluid pressure to said directional valve means for operating the latter to establish the direction of input and return fluid flows therethrough to and from said actuator means;

and pressure compensating means connected across said metering orifice for regulating said reduced flow of input fluid therethrough to said directional valve means.

13. A directional flow control arrangement for selectively operating a fluid-operated actuator means at a controlled speed comprising:

fluid pressure-operated directional valve means constructed and arranged to selectively pass input fluid to said actuator means and simultaneously to pass return fluid from said actuator means, said directional valve means being operable by fluid pressure in a first direction to establish one direction of input and return fluid flows to and from said actuator means, said directional valve means being operable by fluid pressure in a second direction to reverse the direction of input and return fluid flows to and from said actuator means, said directional valve means being operable in response to the pressure of the input fluid flow to said actuator means to variably restrict the return flow from said actuator means so as to maintain a positive pressure of said input fluid flow;

a unitary adjustable metering orifice and pilot valve connected ahead of said directional valve means in fluid communication therewith and operable selectively to establish a metered flow of input fluid to said directional valve means and to apply fluid pressure to said directional valve means for operating the latter to establish the direction of the input and return fluid flows to and from said actuator means;

and pressure compensating means exposed to the fluid pressure on opposite sides of said metering orifice and operable to maintain the fluid flow rate through said metering orifice substantially constant for a given setting of the metering orifice.

14. A directional flow control arrangement for operating a fluid-operated actuator means at a controlled speed comprising:

a pilot-operated spool valve having a first position for establishing one direction of input and return fluid flows simultaneously to and from said actuator means and having a second position for reversing the input and return fluid flows to and from said actuator means, said spool valve being operable to said first position by pilot fluid pressure in one direction, said spool valve being operable to said second position by pilot fluid pressure in the opposite direction, said spool valve being operable in response to the pressure of the input fluid flow to said actuator means to variably restrict the return flow from said actuator means so as to maintain a positive pressure of said input fluid flow;

a manually adjustable pilot valve connected to selectively control the application of pilot fluid pressure to said spool valve to select the direction of input and return fluid flows therethrough to and from said actuator means;

a manually adjustable metering orifice connected ahead of said spool valve in fluid communication therewith and operative to supply a metered flow of input fluid to said spool valve, said metering orifice being coupled to said pilot valve to be adjusted in unison therewith;

and a pressure responsive device connected across said metering orifice and operable in response to the pressure drop thereacross to maintain substantially constant the flow rate of input fluid through said metering orifice for a given setting of the metering orifice.

15. A directional flow control arrangement for operating a fluid-operated actuator means at a controlled speed comprising:

fluid-operated directional valve means for passing input fluid to said actuator means and simultaneously passing return fluid from said actuator means, said directional valve means being operable by fluid pressure in a first direction to establish a first direction of input and return fluid flows to and from said actuator means, said directional valve means being operable by fluid pressure in a second direction to reverse the direction of input and return fluid flows therethrough to and from said actuator means, said directional valve means being operable in response to the pressure of the input fluid flow to said actuator means to variably restrict the return flow from said actuator means so as to maintain a positive pressure of said input fluid flow;

an operator-controlled, adjustable, combined metering orifice and pilot valve connected ahead of said directional valve means in fluid communication therewith and operable to selectively establish a metered flow of input fluid in one or the other of said first and second directions to said directional valve means to determine the direction of input and return fluid flows therethrough and the rates of said fluid flow;

a first pressure compensating means connected to regulate the metered flow of fluid through said combined metering orifice and pilot valve in said first direction to said directional valve means to maintain the input flow rate substantially constant for a given setting of said combined metering orifice and pilot valve;

and a second pressure compensating means connected to regulate the metered flow of fluid through said combined metering orifice and pilot valve in said second direction to said directional valve means to maintain the input flow rate substantially constant for a given setting of said combined metering orifice and pilot valve.

[16. A hydraulic control arrangement comprising pressure-compensated variable orifice means for passing fluid to a hydraulic actuator, and directional control means connected to the outlet of said orifice means to control the fluid flow therefrom to the actuator, said directional control means being selectively operable to reverse the direction of fluid flow to the actuator and thereby reverse the direction of operation of the actuator.]

17. In combination, means defining a variable metering orifice;

means defining an inlet passage leading to said metering orifice;

means defining an outlet passage leading from said metering orifice;

and a pressure compensating piston reciprocably disposed in said outlet passage for regulating the rate of fluid flow from said inlet passage through the metering orifice to said outlet passage, said piston being exposed to the fluid pressure at said inlet passage to be urged thereby in one direction to restrict the fluid flow through said outlet passage, said piston having a restricted passage therein which is open at one end to said outlet passage, means defining a fluid pressure chamber at the opposite end of said restricted passage for applying fluid pressure against the piston which urges the piston in the opposite direction against the force exerted by the fluid pressure at said inlet passage, and a normally closed relief valve in said piston exposed to the fluid pressure in said chamber and operable to open when the fluid pressure thereat exceeds a predetermined value to thereby establish a pressure drop across said restricted passage which pressure unbalances the piston for movement in said one direction by the fluid pressure at said inlet passage.

*18. A directional flow control arrangement for adjustably operating a fluid-operated actuator means at a controlled speed comprising:*

*fluid pressure-operated directional valve means having passages for connection to said actuator means and operable to selectively pass input pressure fluid to said actuator means and to pass return fluid from said actuator means;*

*adjustable means including a metering orifice in fluid communication with said directional valve means at the latter's inlet side and operative to selectively meter the flow of input fluid to said directional valve means and to apply fluid pressure against said directional valve means to operate the latter to establish the direction of input and return fluid flows therethrough;*

*pressure compensating means operatively associated with said adjustable means to regulate the metered flow of input fluid therethrough to said directional valve means;*

*means defining an inlet passage leading to said metering orifice and means defining an outlet passage leading from said metering orifice to said directional valve means;*

*said pressure compensating means comprising a reciprocable piston in said outlet passage, said piston being exposed to the fluid pressure at said inlet passage to be urged thereby in one direction to restrict the fluid flow through said outlet passage, said piston having a restricted passage therein which is open at one end to said outlet passage, means defining a fluid pressure chamber at the opposite end of said restricted passage for applying fluid pressure against the piston which urges the piston in the opposite direction against the force exerted by the fluid pressure at said inlet passage, and a normally closed relief valve in said piston exposed to the fluid pressure in said chamber and operable to open when the fluid pressure thereat exceeds a predetermined value to thereby establish a pressure drop across said restricted passage which pressure unbalances the piston for movement in said one direction by the fluid pressure at said inlet passage.*

*19. A hydraulic flow control arrangement for operating a reversible hydraulically-operated actuator means at a controlled speed comprising:*

*a reversible variable metering orifice device having two alternative flow passages therethrough for selectively establishing the operation of said actuator means in one direction or the opposite direction, said orifice device having adjustable reversible valve means therein for selectively establishing one or the other of said flow passages with an orifice whose size is determined by the setting of said valve means;*

*and pressure-compensating means connected directly to said orifice device and operable in response to the fluid pressure drop across the orifice established by said valve means therein to bypass excess flow away from said orifice and to restrict the flow through the orifice so as to maintain said pressure drop substantially constant for a given setting of said valve means.*

*20. A hydraulic flow control arrangement for operating a reversible hydraulic motor at a controlled speed comprising:*

*a reversible variable metering orifice device having a common flow port and a pair of separate motor ports for connection respectively to the opposite sides of said motor, and an adjustable reversible valve member in said orifice device for selectively connecting said common port to one or the other of said motor ports to establish either of two alternative flow passages through the orifice device with a flow restriction whose size is determined by the position of said valve member;*

*and pressure-compensating valve means connected hydraulically in series directly with said orifice device to regulate the flow therethrough, and means for operating said pressure-compensating valve means in accordance with the fluid pressure differential across the flow passage established in said orifice device to bypass excess flow away from said orifice device and to restrict the flow through said orifice device for maintaining said pressure drop substantially constant for a given size of said flow restriction.*

*21. A hydraulic flow control arrangement for selectively operating a reversible hydraulic motor in either direction at a controlled speed comprising:*

*a reversible metering orifice device including a body having a first flow port and a pair of separate additional flow ports for connection alternatively to said first port to establish one or the other of two different alternative flow passages through said body to operate the motor in one direction or the opposite direction, and valve means in said body between said first port and said additional ports, said valve means being adjustably positionable to selectively connect one or the other of said additional ports to said first port to establish the corresponding flow passage through the orifice device with a flow restriction whose size is determined by the position of said valve means;*

*and pressure-compensating valve means connected hydraulically directly to said orifice device to sense the fluid pressure drop across said flow restriction in the orifice device and operable to bypass excess flow away from the flow passage established in the orifice device by said valve means and to provide an additional flow restriction in series with said flow passage so as to maintain said pressure drop substantially constant for a given position of said valve means.*

References Cited

The following references, cited by the Examiner, are of record in the patented file of this patent or the original patent.

UNITED STATES PATENTS

| | | | |
|---|---|---|---|
| 2,733,662 | 2/1956 | Hunter | 60—52 |
| 2,737,196 | 3/1956 | Eames | 137—101 |
| 2,755,624 | 7/1956 | Klessig et al. | 60—52 |
| 2,993,500 | 7/1961 | Robinson et al. | 137—117 XR |
| 3,024,798 | 3/1962 | Banker | 137—117 XR |
| 3,099,284 | 7/1963 | Thrap et al. | 137—117 |

FOREIGN PATENTS 759,548 10/1956 Great Britain.

HENRY T. KLINKSIEK, *Primary Examiner.*